United States Patent
Fukazawa

(10) Patent No.: US 11,541,894 B2
(45) Date of Patent: Jan. 3, 2023

(54) ROAD SLOPE ESTIMATOR AND VEHICLE

(71) Applicant: ISUZU MOTORS LIMITED, Tokyo (JP)

(72) Inventor: Shinichirou Fukazawa, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 23 days.

(21) Appl. No.: 17/042,419

(22) PCT Filed: Mar. 27, 2019

(86) PCT No.: PCT/JP2019/013112
§ 371 (c)(1),
(2) Date: Sep. 28, 2020

(87) PCT Pub. No.: WO2019/189322
PCT Pub. Date: Oct. 3, 2019

(65) Prior Publication Data
US 2021/0009139 A1 Jan. 14, 2021

(30) Foreign Application Priority Data

Mar. 28, 2018 (JP) .............................. JP2018-062848

(51) Int. Cl.
*B60W 40/076* (2012.01)
*B60W 40/105* (2012.01)
(Continued)

(52) U.S. Cl.
CPC ........ *B60W 40/076* (2013.01); *B60W 40/105* (2013.01); *B60W 40/11* (2013.01); *B60W 40/114* (2013.01); *B60W 40/13* (2013.01); *B60W 2040/1315* (2013.01); *B60W 2520/10* (2013.01); *B60W 2520/14* (2013.01); *B60W 2520/16* (2013.01)

(58) Field of Classification Search
CPC .. B60W 40/076; B60W 40/105; B60W 40/11; B60W 40/114; B60W 40/13;
(Continued)

(56) References Cited

U.S. PATENT DOCUMENTS

| | | | | |
|---|---|---|---|---|
| 5,440,923 A | * | 8/1995 | Arnberg | ................... G01C 7/04 33/341 |
| 9,395,233 B2 | * | 7/2016 | Dourra | ................... B60T 8/1837 |
| 2018/0029603 A1 | * | 2/2018 | Kasaiezadeh Mahabadi | ............. B60W 30/02 |

FOREIGN PATENT DOCUMENTS

| CN | 107074241 A | * | 8/2017 | .......... B60W 40/107 |
|---|---|---|---|---|
| DE | 102010041967 A1 | | 4/2012 | |

(Continued)

OTHER PUBLICATIONS

FR-2884311-A1 translation (Year: 2006).*

(Continued)

*Primary Examiner* — Jeff A Burke
*Assistant Examiner* — Kyle T Johnson
(74) *Attorney, Agent, or Firm* — Brundidge & Stanger, P.C.

(57) ABSTRACT

A slope estimation device estimates a slope of a vehicle traveling road, and includes an input section that acquires a detected value of an acceleration sensor for detecting acceleration in a front-back direction of the vehicle, a centripetal force detecting section that detects centripetal force acting on the acceleration sensor due to a turning motion of the vehicle, and a slope computing section that computes the slope of the vehicle traveling road based on the detected value of the acceleration sensor. When the vehicle is in the turning motion, the slope computing section computes the slope of the traveling road by determining a component of the centripetal force superimposed on the detected value of the acceleration sensor based on a turning center position of the vehicle, a gravity center position of the vehicle, and an installation position of acceleration sensor, and subtracting the component of the centripetal force from the detected value of the acceleration sensor.

3 Claims, 6 Drawing Sheets

(51) Int. Cl.
*B60W 40/11* (2012.01)
*B60W 40/114* (2012.01)
*B60W 40/13* (2012.01)

(58) Field of Classification Search
CPC ..... B60W 2040/1315; B60W 2520/10; B60W 2520/14; B60W 2520/16; B60W 2422/00; B60W 2520/105; B60W 2520/125; B62D 6/00; F16H 59/48; F16H 59/52; F16H 59/66; F16H 61/02
See application file for complete search history.

(56) References Cited

FOREIGN PATENT DOCUMENTS

| | | | | |
|---|---|---|---|---|
| DE | 102013216638 | A1 * | 5/2014 | ................ B60T 8/24 |
| DE | 102013213291 | A1 | 1/2015 | |
| FR | 2884311 | A1 * | 10/2006 | .......... B60W 40/072 |
| GB | 2266957 | A * | 11/1993 | ............. B60T 8/172 |
| JP | 2002162225 | A | 6/2002 | |
| JP | 2010125888 | A | 6/2010 | |
| JP | 2018138432 | A | 9/2018 | |
| JP | 2021076901 | A * | 5/2021 | |
| KR | 20110109606 | A * | 10/2011 | |

OTHER PUBLICATIONS

DE-102013216638-A1 translation (Year: 2014).*
CN-107074241-A translation (Year: 2017).*
JP-2021076901-A translation (Year: 2021).*
KR-20110109606-A Translation (Year: 2011).*
International Search Report from International Application No. PCT/JP2019/013112 dated Jun. 18, 2019.

* cited by examiner

(12) United States Patent

ROAD SLOPE ESTIMATOR AND VEHICLE

TECHNICAL FIELD

The present disclosure relates to a slope estimation device and a vehicle.

BACKGROUND ART

Conventionally, there is known a slope estimation device that estimates a slope of a vehicle traveling road (hereinafter, referred to as "traveling road") with an acceleration sensor mounted on the vehicle for detecting acceleration in a front-back direction.

For example, Patent Literature 1 discloses a slope estimation of the traveling road by extracting a gravity component acting on the acceleration sensor due to the slope of the traveling road (for example, see Patent Literature 1).

CITATION LIST

Patent Literature

PTL 1
Japanese Patent Application Laid-Open No. 2010-125888

SUMMARY OF INVENTION

Technical Problem

However, in the conventional technology disclosed in Patent Literature 1 and the like, there is a risk of deteriorating the accuracy of the slope estimated at the time of corner traveling because a component due to a centripetal force (that is, a centrifugal force) is superimposed on the gravity component due to the slope by the influence of the centripetal force. Long-body vehicles such as large trucks, in particular, are greatly influenced by the centripetal force component due to their large offset between the gravity center position and an installation position of the acceleration sensor.

The present disclosure is made taking into account the above-mentioned problem and aims to provide a slope estimation device and a vehicle each capable of estimating a slope with higher accuracy.

Solution to Problem

The present disclosure mainly solving the problem mentioned above provides a slope estimation device that estimates a slope of a vehicle traveling road, the device including:

an input section that acquires a detected value of an acceleration sensor for detecting acceleration in a front-back direction of the vehicle;

a centripetal force detecting section that detects centripetal force acting on the acceleration sensor due to a turning motion of the vehicle; and a slope computing section that computes the slope of the traveling road based on the detected value of the acceleration sensor, wherein when the vehicle is in the turning motion, the slope computing section computes the slope of the traveling road by determining a component of the centripetal force superimposed on the detected value of the acceleration sensor based on a turning center position of the vehicle, a gravity center position of the vehicle, and an installation position of the acceleration sensor, and by subtracting the component of the centripetal force from the detected value of the acceleration sensor.

In another aspect, a vehicle including the slope estimation device is provided.

Advantageous Effects of Invention

According to the slope estimation device in the present disclosure, it is possible to achieve slope estimation with higher accuracy.

DESCRIPTION OF EMBODIMENTS

Hereinafter, an example of a configuration of a vehicle and a slope estimation device mounted on the vehicle according to an embodiment of the present invention will be described in detail with reference to the accompanying drawings.

Figure 1:
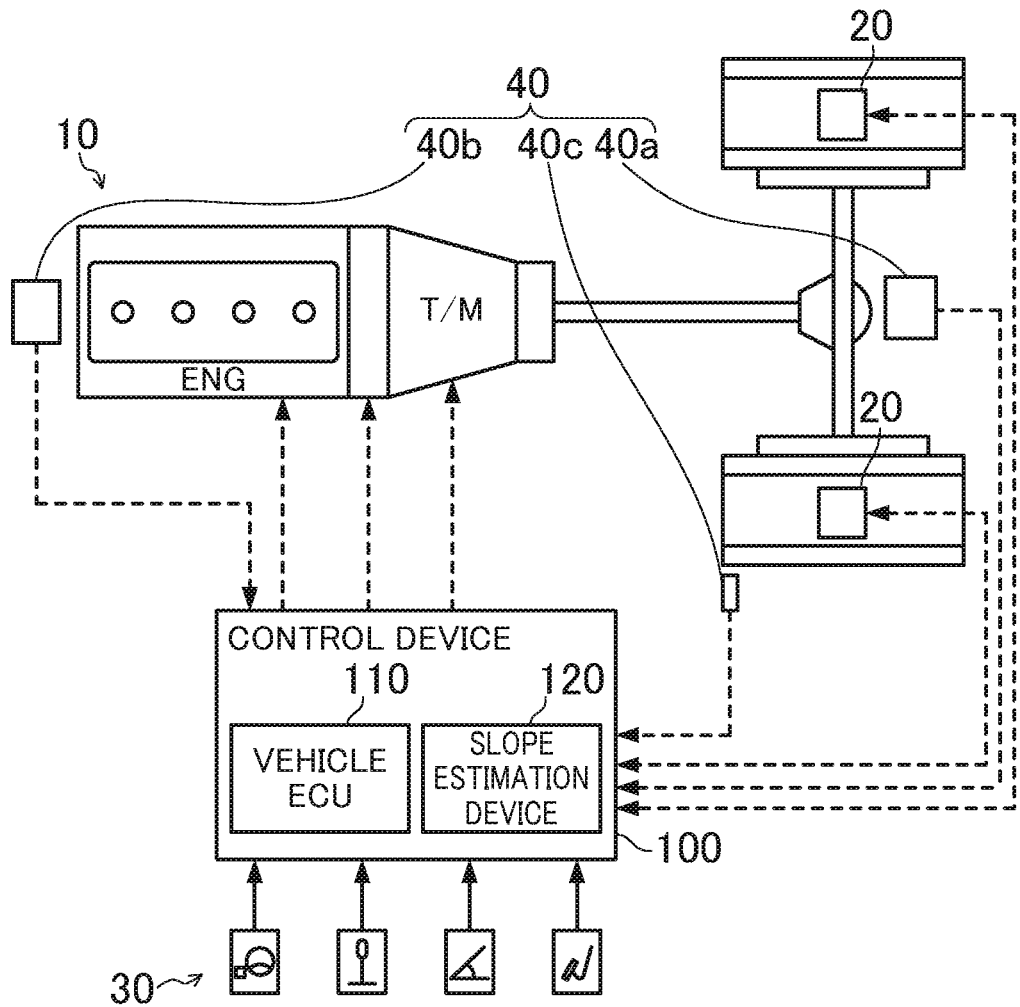
FIG. 1 is a diagram illustrating an example of a configuration of a vehicle according to an embodiment of the present disclosure.

FIG. 1 is a diagram illustrating an example of a configuration of vehicle U according to the present embodiment. Note that the broken lines in FIG. 1 indicate signal paths of control signals that control device 100 transmits and detecting signals that control device 100 receives.

Vehicle U according to the present embodiment includes, for example, vehicle driving device 10, vibration isolating support device 20, operation information acquiring device 30, vehicle information acquiring device 40 (acceleration sensor 40a, yaw rate sensor 40b, and vehicle speed sensor 40c), control device 100 (vehicle ECU 110 and slope estimation device 120) and the like.

Vehicle driving device 10 is a driving section for driving vehicle U, and includes, for example, an engine, an automatic transmission, a power transmission mechanism, a braking mechanism, a steering device, and the like. In vehicle driving device 10, for example, the engine generates power and the power is transmitted to wheels through the automatic transmission and the power transmission mechanism (e.g., a propeller shaft, a differential gear, and a drive shaft), thereby driving vehicle U. Note that the operation of vehicle driving device 10 according to the present embodiment is controlled by vehicle ECU 110.

Vibration isolating support device 20, for example, is placed between the body of vehicle U and each wheel and supports the body of vehicle U from below. An active suspension such as an air suspension, for example, is used as vibration isolating support device 20, and supplies compressed air to an air spring provided corresponding to each wheel so that a potentiometer or the like appropriately detects the vehicle body height. Vibration isolating support device 20 according to the present embodiment transmits the information with regard to the amount of compressed air to be supplied to the air spring to control device 100, and also functions as a means for detecting the load amount of vehicle U.

Operation information acquiring device 30 is a sensor that detects operation information indicating operation contents by a driver, and includes, for example, an accelerator sensor, a brake sensor, a shift lever sensor, and the like. Operation information acquiring device 30 outputs sensor data related to the detected value detected by itself to control device 100.

Vehicle information acquiring device 40 is a variety of sensors that detect the traveling condition of vehicle U. Vehicle information acquiring device 40 according to the present embodiment includes, for example, acceleration sensor 40a, yaw rate sensor 40b, a vehicle speed sensor 40c, and the like. Acceleration sensor 40a, yaw rate sensor 40b, and vehicle speed sensor 40c each transmit sensor information related to the detected value detected by themselves (hereinafter abbreviated as "sensor information") to control device 100 (i.e., slope estimation device 120).

Acceleration sensor 40a detects the acceleration in the front-back direction of vehicle U by a strain gauge, a displacement amount of a piezoelectric element, capacitance, and the like. Note that acceleration sensor 40a according to the present embodiment is a sensor for detecting the acceleration of vehicle U only in the uniaxial front and back direction.

Yaw rate sensor 40b detects the rotational angular velocity about the vertical axis through the rotation center of vehicle U. In this regard, the following methods may be applied for detecting rotational angular velocity of vehicle U in addition to directly detecting by the detected value of yaw rate sensor 40b: the method of using a detected value of a wheel speed difference sensor (not illustrated) for detecting a rotational speed difference between the left and right wheels (e.g., front wheels) of vehicle U, or the method of using a detected value of a steering angle sensor (not illustrated) for detecting a steering angle (e.g., a turning angle of the front wheels) of vehicle U.

Vehicle speed sensor 40c detects the traveling speed of vehicle U by, for example, the rotational speed of the wheels of vehicle U.

Control device 100 is an electronic control unit that integrally controls various parts of vehicle U. Control device 100 according to the present embodiment includes vehicle electronic control unit (ECU) 110 that controls vehicle driving device 10, and slope estimation device 120 that estimates the slope of the traveling road of vehicle U.

Each of vehicle ECU 110 and slope estimation device 120 includes, for example, a central processing unit (CPU)), a read only memory (ROM), a random access memory (RAM), an input port, an output port, and the like. Functions of vehicle ECU 110 and slope estimation device 120 are implemented by, for example, the CPU referring to control programs and various data stored in the ROM and the RAM. Note that not only processing by software but also a dedicated hardware circuit can obviously implement the functions.

Incidentally, vehicle driving device 10, vibration isolating support device 20, operation information acquiring device 30, vehicle information acquiring device 40 (acceleration sensor 40a, yaw rate sensor 40b, and vehicle speed sensor 40c), and control device 100 (vehicle ECU 110 and slope estimation device 120) are mutually connected via an in-vehicle network (e.g., a communication network that conforms to CAN communication protocol), and this enables to mutually transmit and receive required data and control signals.

[Configuration of the Slope Estimation Device]

Hereinafter, an example of a configuration of slope estimation device 120 according to the present embodiment will be described referring to FIGS. 2 to 5.

Figure 2:
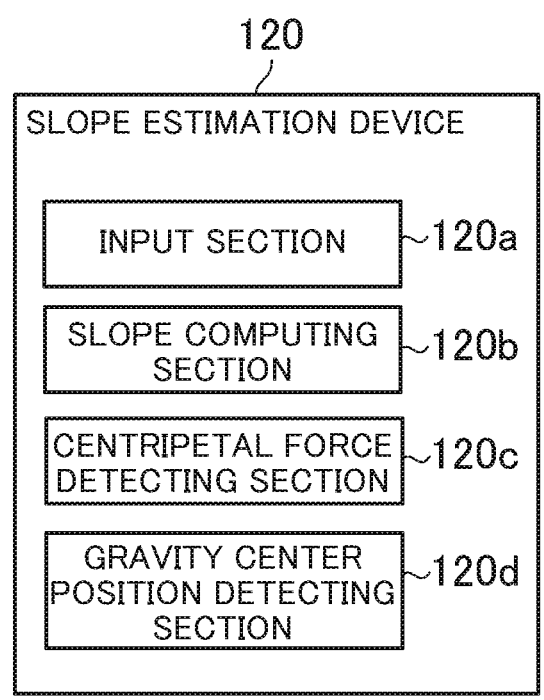
FIG. 2 is diagram illustrating an example of a functional configuration included in a slope estimation device according to the embodiment of the present disclosure.
Figure 3:
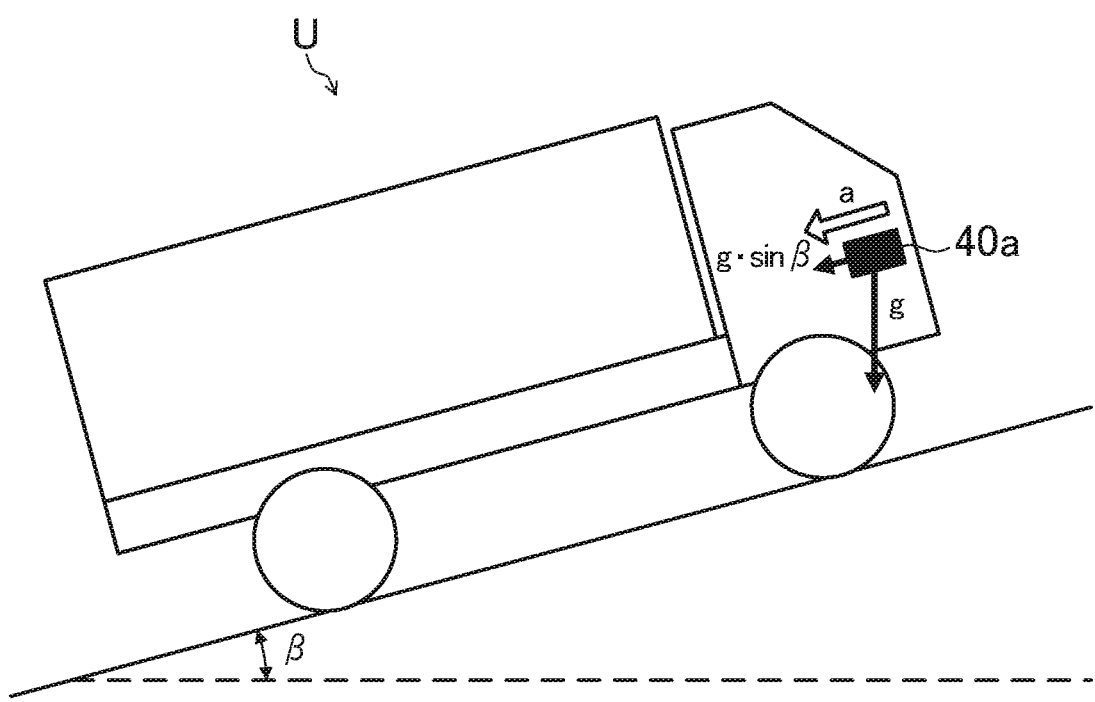
FIG. 3 is a diagram illustrating a slope estimation method in the slope estimation device according to the embodiment of the present disclosure.
Figure 4:
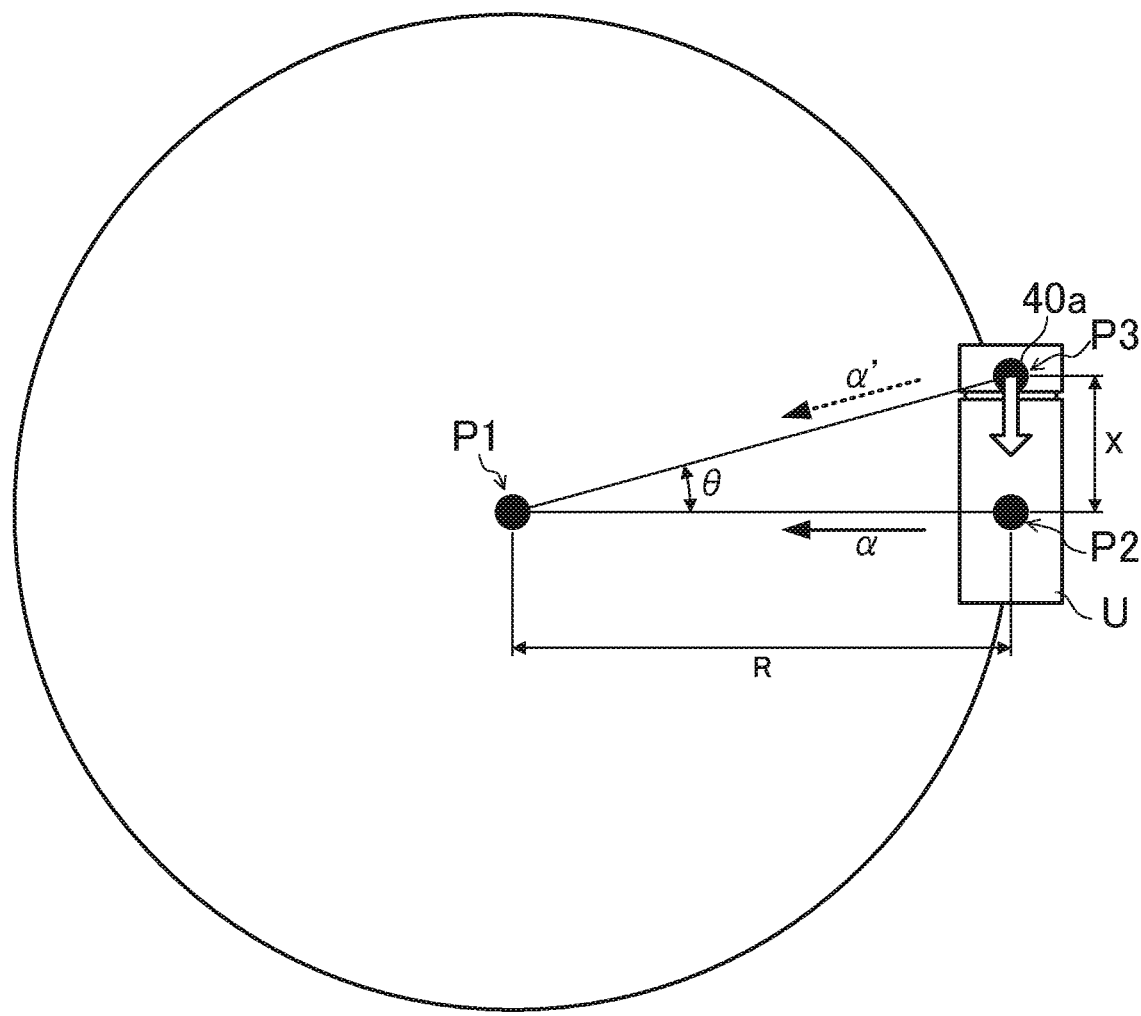
FIG. 4 is a diagram illustrating a slope estimation method in the slope estimation device according to the embodiment of the present disclosure.
Figure 5:
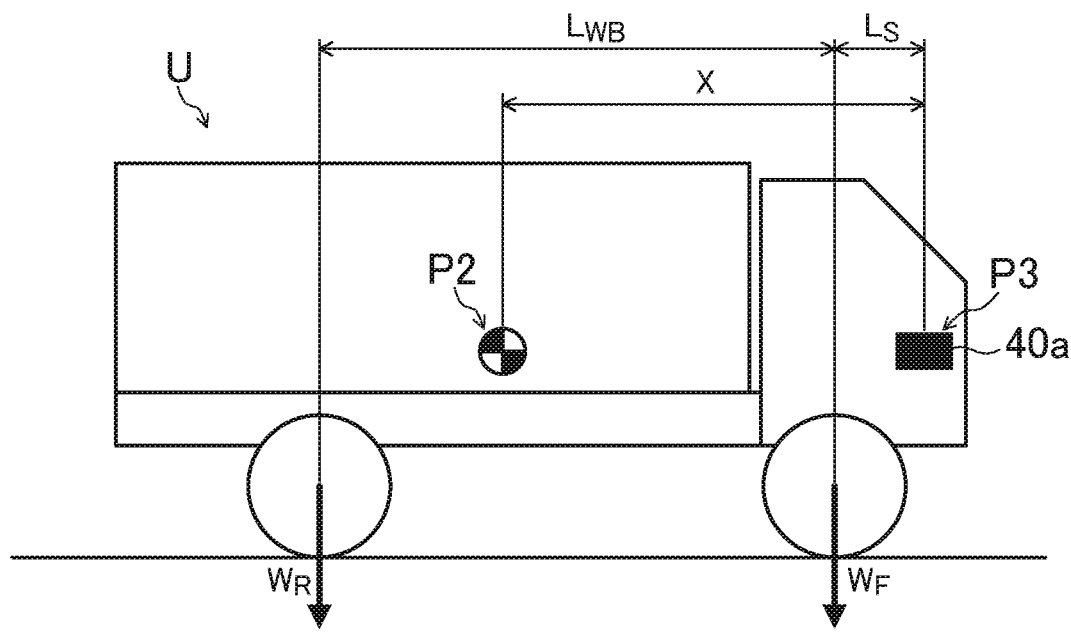
FIG. 5 is a diagram illustrating a slope estimation method in the slope estimation device according to the embodiment of the present disclosure.

FIG. 2 is a diagram illustrating an example of a functional configuration included in slope estimation device 120 according to the present embodiment. FIGS. 3 to 5 are diagrams illustrating slope estimation methods in slope estimation device 120 according to the present embodiment.

Slope estimation device 120 according to the present embodiment includes input section 120a, slope computing section 120b, centripetal force detecting section 120c, and gravity center position detecting section 120d.

<Configuration of Input Section 120a>

Input section 120a acquires the detected values of various sensors such as acceleration sensor 40a, yaw rate sensor 40b, vehicle speed sensor 40c and the like.

Note that input section 120a may be configured to directly acquire these detected values from the respective sensors, or indirectly acquire these detected values via other devices.

<Configuration of Slope Computing Section 120b>

Slope computing section 120b computes a slope of a traveling road by extracting a gravity component caused by the slope of the traveling road from the detected value of acceleration sensor 40a acquired by input section 120a.

FIG. 3 illustrates a gravity acceleration acting on acceleration sensor 40a when vehicle U is traveling on a road surface with a slope. Note that in FIG. 3, β indicates the slope of a traveling road, g indicates a gravity acceleration, and a indicates a detected component (i.e., a detected value) of acceleration sensor 40a.

Acceleration sensor 40a according to the present embodiment is a sensor for detecting the acceleration of vehicle U in the uniaxial front and back direction. Thus, acceleration sensor 40a detects a gravity component of g×sin β according to the slope of the traveling road when vehicle U is traveling on a road surface with a slope. Slope computing section 120b computes slope β of the traveling road from the gravity component included in the detected value of acceleration sensor 40a, for example, using following equation 1:

[1]

$$a = g \times \sin \beta \quad \text{(Equation 1)}$$

(wherein, a is a detected value of acceleration sensor 40a, g is a gravity acceleration, and β is a slope of a traveling road).

The detected value of acceleration sensor 40a, however, includes a centripetal force component caused by a turning motion during traveling, an acceleration/deceleration component caused by the acceleration/deceleration of vehicle U and the like in addition to the gravity component caused by the slope of the surface of the traveling road. This causes slope computing section 120b to compute the slope of the traveling road greater than actual, and furthermore, to compute as if the slope is suddenly changed in the case of not taking consideration of the centripetal force for example, acting on acceleration sensor 40a at the time of turning.

Incidentally, the slope information of the traveling road is referred, for example, when vehicle ECU 110 performs the shift control of the automatic transmission of vehicle U. Thus, vehicle ECU 110 recognizes as if the slope resistance has suddenly changed when the slope information is incorrectly computed as described above, and causes the erroneous shifting of the automatic transmission of vehicle U and a busy shift (a frequent shift).

From this point of view, slope computing section 120b computes the slope of the traveling road by subtracting the centripetal force component and the like from the detected value of acceleration sensor 40a.

FIG. 4 is a diagram illustrating the centripetal force acting on acceleration sensor 40a when vehicle U is in a turning motion. Note that in FIG. 4, a indicates a detected component of acceleration sensor 40a, α indicates centripetal force at a gravity center position, α' indicates centripetal force at an installation position of acceleration sensor 40a, P1 indicates a turning center position when vehicle U is in a turning motion, P2 indicates a gravity center position in a front-back direction of vehicle U, P3 indicates the installation position of acceleration sensor 40a, θ indicates an angle between the gravity center position P2 and the installation position P3 of acceleration sensor 40a, seen from the turning center position P1, X indicates an offset, and R indicates a turning radius.

The centripetal force when vehicle U is in a turning motion works in a direction orthogonal to the detecting direction of acceleration sensor 40a (i.e., the front-back direction of vehicle U) in the case of a short-body vehicle U because installation position P3 of acceleration sensor 40a in the front-back direction of vehicle U and gravity center position P2 substantially coincide with each other. Thus, the centripetal force causes a small influence on the detected value of acceleration sensor 40a for the short-body vehicle U.

For a long-body vehicle U such as a large truck, however, acceleration sensor 40a is often placed in the front area of the vehicle body of vehicle U. This causes a certain offset X, as illustrated in FIG. 4, between installation position P3 of acceleration sensor 40a in the front-back direction of vehicle U and gravity center position P2. For such a vehicle U, the direction of centripetal force α' acting on acceleration sensor 40a with the turning motion is thus inclined from a direction orthogonal to the detecting direction of acceleration sensor 40a (i.e., the front-back direction of vehicle U). As a result, centripetal force α' acting on acceleration sensor 40a causes a great influence on the detected value of acceleration sensor 40a.

To be more specific, α' sin θ out of centripetal force α' acting on acceleration sensor 40a with the turning motion superimposes on the detected value of acceleration sensor 40a in FIG. 4.

In this regard, slope computing section 120b according to the present embodiment detects a centripetal force component α' sin θ superimposed on the detection value of acceleration sensor 40a by using the information of "centripetal force α' acting on acceleration sensor 40a" detected by centripetal force detecting section 120c and the information of "a positional relationship (e.g., angle θ between gravity center position P2 and installation position P3 of acceleration sensor 40a, seen from turning center position P1) among three positions: turning center position P1 when vehicle U is in a turning motion, gravity center position P2 in the front-back direction of vehicle U, and installation position P3 of acceleration sensor 40a" based on gravity center position P2 detected by gravity center position detecting section 120d.

Slope computing section 120b computes slope β of the traveling road by subtracting the component of centripetal force α' acting on acceleration sensor 40a with the turning motion from the detected value of acceleration sensor 40a, for example, using following equation 2:

[2]

$$a = g \times \sin\beta + \alpha' \sin\theta \qquad \text{(Equation 2)}$$

(wherein, a is a detected value of acceleration sensor 40a, g is a gravity acceleration, β is a slope of a traveling road, α' is centripetal force, and θ is an angle between gravity center position P2 and installation position P3 of acceleration sensor 40a, seen from turning center position P1).

Here, "angle θ between gravity center position P2 and installation position P3 of acceleration sensor 40a, seen from turning center position P1" is determined, for example, by tan θ=offset X/turning radius R according to the relationship between turning radius R and offset X.

Turning radius R can be determined from sensor information indicating the turning behavior of vehicle U. Turning radius R can be determined, for example, by R=vehicle speed v [m/s]/rotational angular velocity w [θ/s] from the relationship between the rotational angular velocity of vehicle U (e.g., the detected value of yaw rate sensor 40b) and the vehicle speed (e.g., the detected value of vehicle speed sensor 40c).

The information of predetermined gravity center position P2 can be used for offset X when there is no variation in gravity center position P2 in the front-back direction of vehicle U. For large trucks or the like, however, the gravity center position P2 varies according to the load amount of vehicle U. For this reason, it is preferable to determine offset X based on the information of gravity center position P2 obtained by gravity center position detecting section 120d which will be described later.

Although the description thereof is omitted because it is a known art, slope computing section 120b may further compute the slope of the traveling road by subtracting the component caused by the acceleration/deceleration of vehicle U and the component caused by the pitching motion of vehicle U from the detected value of acceleration sensor 40a.

<Configuration of Centripetal Force Detecting Section 120c>

Centripetal force detecting section 120c detects centripetal force α', which acts on acceleration sensor 40a and is caused by the turning motion of vehicle U, based on the detected values of various sensors (e.g., yaw rate sensor 40b and vehicle speed sensor 40c) acquired by input section 120a. Note that centripetal force α' acting on acceleration sensor 40a is as strong as centripetal force α at gravity center position P2.

Centripetal force detecting section 120c detects centripetal force α' acting on acceleration sensor 40a by, for example, the product of the rotational angular velocity of vehicle U (e.g., the detected value of yaw rate sensor 40b) and the vehicle speed of vehicle U (e.g., the detected value of vehicle speed sensor 40c) at the present time (i.e., v [m/s]×ω [θ/s]) in accordance with the mechanical law.

Note that slope computing section 120b and centripetal force detecting section 120c may use the target value of the vehicle speed determined by vehicle ECU 110 or the like for the information of the vehicle speed of vehicle U or the like in place of sensor information of the various sensors.

<Configuration of Gravity Center Position Detecting Section 120d>

Gravity center position detecting section 120d detects gravity center position P2 corresponding to the load amount of vehicle U.

FIG. 5 is a diagram illustrating gravity center position P2 in the front-back direction of vehicle U. Note that in FIG. 5, $W_F$ indicates the load applied to the front axis, $W_R$ indicates a load applied to the rear axis, X indicates a distance between installation position P3 of acceleration sensor 40a and gravity center position P2, $L_S$ indicates a distance between installation position P3 of acceleration sensor 40a and the front axis, and $L_{WB}$ indicates a wheelbase.

In vehicle U such as large trucks, gravity center position P2 in the front-back direction of vehicle U varies according to the load amount. The variation in gravity center position P2 is typically caused by a variation in balance between load $W_F$ applied to the front axis and load $W_R$ applied to the rear axis in accordance with the load amount.

From this point of view, gravity center position detecting section 120d detects gravity center position P2 by using the information related to the operation condition of vibration isolating support device 20 that supports the body of vehicle U. Gravity center position detecting section 120d detects the balance between load $W_F$ applied to the front axis and load $W_R$ applied to the rear axis, for example, on the basis of the information on the amount of compressed air supplied to each air spring for the front axis and the rear axis in vibration isolating support device 20, thereby detecting gravity center position P2.

Gravity center position detecting section 120d detects gravity center position P2 in the front-back direction of vehicle U, for example, using following equation 3.

$$X = \frac{W_R}{W_R + W_F} L_{WB} + L_S \quad \text{(Equation 3)}$$

(Wherein, X is a distance between installation position P3 of acceleration sensor 40a and gravity center position P2, $L_S$ is a distance between installation position P3 of acceleration sensor 40a and the front axis, $L_{WB}$ is a wheelbase, $W_F$ is a load applied to the front axis, and $W_R$ is a load applied to the rear axis.)

Note that the method by which gravity center position detecting section 120d detects gravity center position P2 in the front-back direction of vehicle U can be variously changed. For example, gravity center position detecting section 120d may detect gravity center position P2 from the current load amount by previously storing gravity center position P2 and the load amount in association with each other in the ROM of slope estimation device 120 or the like. From the viewpoint of detecting gravity center position P2 with high accuracy, it is preferable to use the information related to the operation condition of vibration isolating support device 20.

[Operation of Slope Estimation Device]

Next, an example of the operation of slope estimation device 120 will be described referring to FIG. 6.

Figure 6:
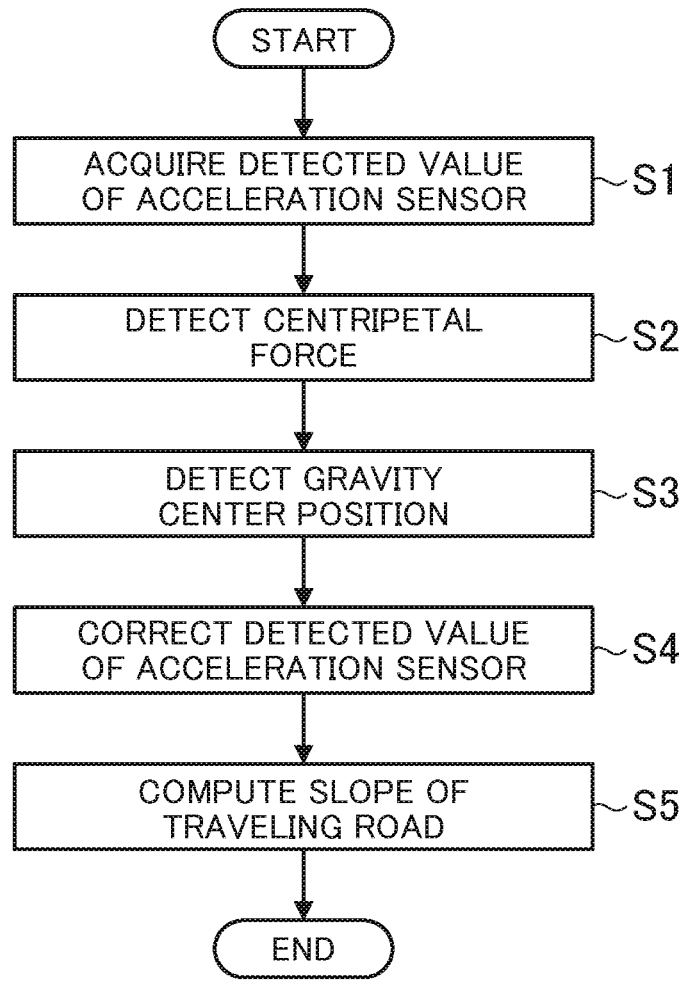
FIG. 6 is a flowchart indicating an example of an operation of the slope estimation device according to the embodiment of the present disclosure.

FIG. 6 is a flowchart indicating an example of the operation of slope estimation device 120. Note that the steps in FIG. 6 are executed at predetermined intervals (e.g., one second intervals) by slope estimation device 120 in accordance with the computer program.

In step S11, slope estimation device 120 (i.e., input section 120a) first acquires sensor information of various sensors including the detected value of acceleration sensor 40a.

In step S2, slope estimation device 120 (i.e., centripetal force detecting section 120c) detects centripetal force α' acting on acceleration sensor 40a. At this time, slope estimation device 120 (i.e., centripetal force detecting section 120c) detects centripetal force α' acting on acceleration sensor 40a by the product of the rotational angular velocity of vehicle U and the vehicle speed of vehicle U at the present time (i.e., v [m/s]×ω [θ/s]) using, for example, the detected value of yaw rate sensor 40b and the detected value of vehicle speed sensor 40c.

In step S3, slope estimation device 120 (i.e., gravity center position detecting section 120d) detects gravity center position P2 of vehicle U in the front-back direction. At this time, slope estimation device 120 (i.e., gravity center position detecting section 120d) acquires, for example, information indicating the operation condition of vibration isolating support device 20, and detects gravity center position P2 of vehicle U in the front-back direction using the above equation 3.

In step S4, slope estimation device 120 (i.e., slope computing section 120b) corrects the detected value of acceleration sensor 40a acquired by input section 120a, based on the above equation 2 using centripetal force α' acting on acceleration sensor 40a detected in step S2 and gravity center position P2 detected in step S3. At this time, slope estimation device 120 (i.e., slope computing section 120b) computes angle θ between gravity center position P2 and installation position P3 of acceleration sensor 40a, seen from turning center position P1 (tan θ=offset X/turning radius R), for example, from gravity center position P2 detected in step S3, and subtracts a centripetal force component α' sin θ superimposed on the detected value of acceleration sensor 40a from the detected value.

Note that in this step S4, slope estimation device 120 (i.e., slope computing section 120b) may also subtract a component caused by the acceleration/deceleration of vehicle U and a component caused by the pitching motion of vehicle U each superimposed on the detected value of acceleration sensor 40a from the detected value of acceleration sensor 40a.

In step S5, slope estimation device 120 (i.e., slope computing section 120b) computes slope β of a traveling road based on the above equation 1.

[Effect]

As described above, slope estimation device 120 according to the present embodiment includes input section 120a that acquires a detected value of acceleration sensor 40a for detecting acceleration in a front-back direction of vehicle U, centripetal force detecting section 120c that detects centripetal force acting on acceleration sensor 40a due to a turning motion of vehicle U, and slope computing section 120b that computes a slope of a traveling road of vehicle U based on the detected value of acceleration sensor 40a. When vehicle U is in a turning motion, slope computing section 120b computes the slope of the traveling road by determining a centripetal force component superimposed on the detected value of acceleration sensor 40a from a positional relationship among three positions: turning center position P1 of vehicle U, gravity center position P2 of vehicle U, and installation position P3 of acceleration sensor 40a, and by subtracting the centripetal force component from the detected value of acceleration sensor 40a.

Therefore, slope estimation device 120 according to the present embodiment makes it possible to correct the detected value of acceleration sensor 40a subtracting the component of centripetal force acting due to the turning motion of vehicle U. This enables to estimate the slope of the traveling road with higher accuracy from the detected value of acceleration sensor 40a. This also enables to estimate, for example, the traveling resistance (the slope resistance in particular) acting on vehicle U with high accuracy.

In addition, slope estimation device 120 according to the present embodiment further includes gravity center position detecting section 120*d* that detects the gravity center position corresponding to the load amount of vehicle U, and slope computing section 120*b* computes the slope of the traveling road based on the detected gravity center position. This makes it possible to compute the slope of the traveling road with higher accuracy.

Other Embodiments

The present invention is not limited to the above embodiment, and various modifications are conceivable.

As an example of slope estimation device 120, although the above embodiment showed that the functions of input section 120*a*, slope computing section 120*b*, centripetal force detecting section 120*c*, and gravity center position detecting section 120*d* are implemented by one computer, the functions may obviously be implemented by a plurality of computers. For example, slope computing section 120*b* and gravity center position detecting section 120*d* may be implemented by separate computers. Additionally, they may obviously be incorporated as a part of vehicle ECU 110 or the like.

Further, although the above embodiment showed as an example of slope estimation device 120 that the processes of input section 120*a*, slope computing section 120*b*, centripetal force detecting section 120*c*, and gravity center position detecting section 120*d* are executed in a series of flow, some of these processes may be executed in parallel.

While concrete examples of the present invention have been described in detail above, those examples are mere examples and do not limit the scope of the appended claims. The techniques disclosed in the scope of the appended claims include various modifications and variations of the concrete examples exemplified above.

This application is based on Japanese Patent Application No. 2018-062848, filed on Mar. 28, 2018, the disclosure of which including the specification, drawings and abstract is incorporated herein by reference in its entirety.

INDUSTRIAL APPLICABILITY

According to the slope estimation device in the present disclosure, it is possible to achieve slope estimation with higher accuracy.

REFERENCE SIGNS LIST

U Vehicle
10 Vehicle driving device
20 Vibration isolating support device
30 Operation information acquiring device
40 Vehicle information acquiring device
40*a* Acceleration sensor
40*b* Yaw rate sensor
40*c* Vehicle speed sensor
100 Control device
110 Vehicle electronic control unit (ECU)
120 Slope estimation device
120*a* Input section
120*b* Slope computing section
120*c* Centripetal force detecting section
120*d* Gravity center position detecting section

What is claimed is:

1. A road slope estimator that estimates a slope of a traveling road where a vehicle travels, the slope estimator comprising:
a memory storing executable instructions that, in response to execution, cause a hardware processor to perform operations including:
acquiring a detected value (a) of an acceleration sensor for detecting acceleration in a front-back direction of a vehicle;
detecting centripetal force ($\alpha'$) acting on the acceleration sensor due to a turning motion of the vehicle;
detecting a gravity center position depending on a load amount of the vehicle;
computing a slope ($\beta$) of the traveling road where the vehicle travels, using equation 1 based on the detected value (a) of the acceleration sensor; and
performing a shift control of a transmission of the vehicle by referring to the computed slope ($\beta$);
wherein when the vehicle is in the turning motion, the hardware processor computes the slope ($\beta$) of the traveling road using equation 2 instead of the equation 1, by determining a component ($\alpha' \sin \theta$) of the centripetal force superimposed on the detected value (a) of the acceleration sensor based on a positional relationship ($\theta$) between three points of a turning center position of the vehicle, the gravity center position of the vehicle, and an installation position of the acceleration sensor, and by subtracting the component ($\alpha' \sin \theta$) of the centripetal force from the detected value (a) of the acceleration sensor;
wherein the equation 1 is $a = g \times \sin \beta$, the a in the equation 1 is the detected value of the acceleration sensor, the g is a gravity acceleration, and the $\beta$ is the slope of the traveling road;
wherein the equation 2 is $a = g \times \sin \beta + \alpha' \sin \theta$, the a is the detected value of the acceleration sensor, the g is a gravity acceleration, the $\beta$ is the slope of the traveling road, the a' is the centripetal force, and the $\theta$ is an angle between gravity center position and installation position of the acceleration sensor, seen from turning center position;
wherein the hardware processor detects the gravity center position using equation 3, based on an operation condition of a vibration isolating support device that supports a body of the vehicle; and
wherein equation 3 is $$X = \frac{W_R}{W_R + W_F} L_{WB} + L_S,$$

the X is a distance between installation position of the acceleration sensor and the gravity center position, the $L_s$ is a distance between installation position of the acceleration sensor and the front axis, the $L_{ws}$ is a wheelbase, the $W_F$ is a load applied to the front axis, and the $W_R$ is a load applied to the rear axis.

2. The road slope estimator according to claim 1, wherein the hardware processor detects the centripetal force based on rotational angular velocity of the vehicle and vehicle speed of the vehicle.

3. A vehicle comprising the road slope estimator according to claim 1.

* * * * *